(12) United States Patent
Topalli

(10) Patent No.: US 10,880,478 B2
(45) Date of Patent: Dec. 29, 2020

(54) CAMERA, SYSTEM AND METHOD OF SELECTING CAMERA SETTINGS

(71) Applicant: Sony Corporation, Tokyo (JP)

(72) Inventor: Ayca Topalli, Basingstoke (GB)

(73) Assignees: SONY EUROPE LIMITED, Weybridge (GB); Sony Corporation, Tokyo (JP)

( * ) Notice: Subject to any disclaimer, the term of this patent is extended or adjusted under 35 U.S.C. 154(b) by 0 days.

(21) Appl. No.: 16/431,867

(22) Filed: Jun. 5, 2019

(65) Prior Publication Data

US 2019/0379832 A1 Dec. 12, 2019

(30) Foreign Application Priority Data

Jun. 11, 2018 (GB) .................................. 1809523.2

(51) Int. Cl.
*H04N 5/232* (2006.01)

(52) U.S. Cl.
CPC ... *H04N 5/23245* (2013.01); *H04N 5/232933* (2018.08); *H04N 5/232939* (2018.08)

(58) Field of Classification Search
CPC ......... H04N 5/23245; H04N 5/232939; H04N 5/232933; H04N 5/23218; H04N 1/32128; H04N 1/32101; H04N 2201/3253; H04N 2201/3252; H04N 5/23222
See application file for complete search history.

(56) References Cited

U.S. PATENT DOCUMENTS

| 6,914,624 B1 | 7/2005 | Esquibel et al. |
| 2008/0056706 A1 | 3/2008 | Battles et al. |
| 2008/0298795 A1 | 12/2008 | Kuberka et al. |

(Continued)

FOREIGN PATENT DOCUMENTS

| CN | 1845585 | 10/2006 |
| CN | 101682695 | 3/2010 |

(Continued)

OTHER PUBLICATIONS

Hillen, B. et al. "Arsenal is artificial intelligence for your DSLR or mirrorless camera", https://www.dpreview.com/news/3902928422/arsenal-is-an-intelligent-assistant-for-dslr-and-mirrorless-cameras, 2017, 7 pages.

(Continued)

*Primary Examiner* — Nicholas G Giles
(74) *Attorney, Agent, or Firm* — Oblon, McClelland, Maier & Neustadt, L.L.P.

(57) ABSTRACT

A camera comprises a memory configured to store a plurality of respective camera settings previously used by the camera when capturing images, a memory configured to store a plurality of image characteristics derived for previous captured images, a correlation processor configured to provide a correlation between stored image characteristics and stored respective camera settings, a detection processor configured to detect live image characteristics for a current live view obtained by the camera, the correlation processor being configured to identify stored respective camera settings most closely correlating to the live image characteristics, and the camera being configured to provide the identified camera settings.

18 Claims, 4 Drawing Sheets

(56) References Cited

U.S. PATENT DOCUMENTS

2016/0142626 A1\* 5/2016 Bostick .................. G06F 16/29
348/207.11

FOREIGN PATENT DOCUMENTS

| CN | 103051804 | 4/2013 |
| JP | 2013-207471 | 10/2013 |

OTHER PUBLICATIONS

Miller, M. "Huawei Mate 10 Pro camera: Enhancing auto mode through artificial intelligence", https://www.zdnet.com/articie/huawei-mate-10-pro-camera-enhancing-auto-mode-through-artificial-intelligence, 2017, 14 pages.

Coxworth, B. "Aurga uses AI to run your camera", https://newatlas.com/aurga-ai-dslr/53238/, 2018, 4 pages.

Carnathan, B. "Canon EOS Rebel SL2/200D Review", https://www.the-digital-picture.com/Reviews/Canon-EOS-Rebel-SL2.aspx, 2018, 4 pages.

\* cited by examiner

CAMERA, SYSTEM AND METHOD OF SELECTING CAMERA SETTINGS

CROSS REFERENCE TO RELATED APPLICATIONS

The present application claims priority to United Kingdom application 1809.523.2 filed on 11 Jun. 2018, the contents of which being incorporated herein by reference in its entirety.

The present disclosure relates to a camera, system and method of selecting camera settings.

Modern cameras, both for still and video image capture, are capable of using automatic settings that respond, according to predefined rules, to camera measurements such as brightness of the scene, focal depth and the like, in order to generate good shots reliably.

However, these automatic settings do not always produce the desired result, either because the scene comprises elements that have not been anticipated by the predefined rules, or because the results, whilst good by some objective measures, do not please the user for aesthetic reasons.

Because of this, some cameras also allow user to manually set some or all of the camera settings (for example, setting one or more of aperture size, shutter speed, focus sampling, exposure adjustment, ISO, colour saturation, colour temperature, flash and the like), optionally with settings that are not manually set being automatically adjusted in response to the manual settings, to create camera settings where one or more automatic features are overridden by manual choices of the user.

However, this process can be slow to implement using the user interface of the camera, and so it is possible that the user would miss the desired shot whilst setting the camera up to take it.

Consequently, some cameras also have one or more buttons or selectable modes to which such manually defined camera settings can be associated, thereby making selection of these settings quicker and easier.

However, there is still scope to improve the mechanism by which such settings can be selected.

The present disclosure seeks to address or mitigate this and other problems.

In a first aspect, a camera is provided in accordance with claim 1.

In another aspect, a method of selecting camera settings for a camera is provided in accordance with claim 11.

In another aspect, a computer is provided in accordance with claim 12.

In another aspect, a system is provided in accordance with claim 13.

In another aspect, a method of selecting camera settings for cameras provided in accordance with claim 14.

Further respective aspects and features of the disclosure are defined in the appended claims.

Embodiments of the present disclosure will now be described by way of example with reference to the accompanying drawings, in which.

Figure 1:
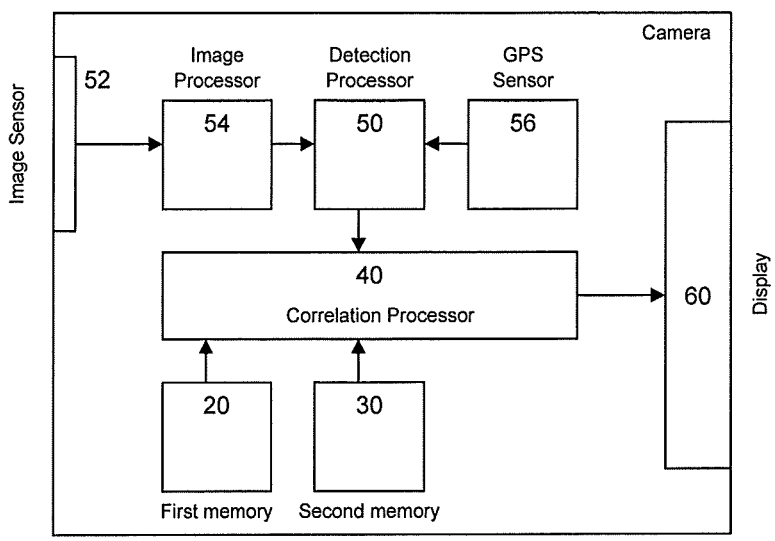
FIG. 1 is a schematic diagram of a camera in accordance with embodiments of the present disclosure.

A camera, a system, and a method of selecting camera settings are disclosed. In the following description, a number of specific details are presented in order to provide a thorough understanding of the embodiments of the present disclosure. It will be apparent, however, to a person skilled in the art that these specific details need not be employed to practice the present disclosure. Conversely, specific details known to the person skilled in the art are omitted for the purposes of clarity where appropriate.

In an embodiment of the present disclosure, a camera 10, which for the purposes of explanation herein is a still camera, but may equally be a video camera, comprises a first memory 20 configured to store a plurality of respective camera settings previously used by a user of the camera when capturing previous images. In embodiments the camera may be a mirrorless camera, a fixed lens camera, an interchangeable lens camera, a (rugged) action camera, a lens based camera which offloads at least some processing to a portable computing device wirelessly or by physical connection. In embodiments, the camera may be part of a vision system of an industrial camera for example for use with an automotive vehicle, unmanned aerial vehicle, robot, security camera, etc. The camera also comprises a second memory 30 configured to store a plurality of image characteristics derived for previous images captured by the user. It will be appreciated that the first and second memories may be part of a single memory system, for example occupying respective areas of a flash memory of the camera. Camera 10 may be included in a mobile telephone which is within the scope of the claims.

The respective camera settings may be organised in one or more ways. In one instance, respective camera settings are organised as a heterogeneous set of camera settings that together may be used to set the camera. Example settings may include the time of day, exposure adjustments, ISO, aperture size, shutter speed, flash settings, colour balance, saturation and the like. Such a set may comprise for example a setting for the aperture, a setting for the ISO, a setting for the flash and so on. In embodiments, the heterogeneous or 'mixed' set of camera settings comprises at least two different types of settings; for example the time of day and the exposure adjustments as indicated in the non-exhaustive list above.

In another instance, respective camera settings are organised as homogenous set of settings, requiring selection of a respective setting from different sets to put together settings for use by the camera. One such homogenous set may comprise for example several aperture settings, whilst another may comprise several ISO settings. Each homogenous or 'single' set corresponds to one type of camera setting.

Similarly image characteristics may be organised as a heterogeneous set of image characteristics that together characterise an individual image. Such a set may comprise for example one or more of global positioning system (GPS) data indicative of the location of an image, feature data or a feature vector derived from an image (for example an eigenvector, or any other reduced dimension representation or summarisation of characteristics of salient features of an image); a thumbnail of an image; and a parametric description of an image. Parameters may include one or more brightness values derived from the image, a brightness histogram of the image, red, green and/or blue colour histograms of the image, an exposure classification (under-, normal-, or over-exposed), and any suitable descriptive metadata associated with an image, such as the focal position within the image where a multipoint focus was used.

The camera also comprises a correlation processor 40 (for example a general-purpose central processing unit operating under suitable software instruction) configured to provide a correlation between stored image characteristics and stored respective camera settings.

Correlations can be provided in a number of ways, as described herein.

A correlation may be a simple 1:1 association between a single heterogeneous set of camera settings and a single heterogeneous set of image characteristics characterising an individual image. Such a correlation simply associates the stored image characteristics of an individual image with the settings used when that image was taken (or at least the manually set or non-automatic settings used).

Alternatively or in addition, a correlation may be a 1:1 association between a single heterogeneous set of camera settings and a single image characteristic that may be common to multiple images. An example of a single image characteristic may be a set of GPS coordinates, one or more most salient values from a feature vector, or one or more parameters from a parametric description of an image.

Alternatively or in addition, a correlation may be a 1:1 association between a single camera setting value within a homogenous set, and a single heterogeneous set of image characteristics characterising an individual image. In this case, the stored image characteristics of an individual image become associated with an individual camera setting value. It will be appreciated that by creating multiple correlations of this type, an effect similar to the association between an individual image and a heterogeneous set of camera settings maybe achieved.

Alternatively or in addition, correlations may be more complex. For either heterogeneous sets of camera settings, or individual values within homogenous sets of camera settings, the frequency with which a particular setting is used to generate an image that has either a heterogeneous set of image characteristics or an individual image characteristic can be used to indicate the strength of association between camera settings and image characteristics.

That is to say, for any of the 1:1 associations described above, alternatively or in addition, a strength of association or correlation can be obtained based upon a frequency of co-occurrence between individual or groups of settings and individual or groups of image characteristics.

Such strength of association or correlation may be achieved by use of histograms or other frequency measures associating settings and characteristics, or by any rule-based probability measurement scheme, or by a machine learning system such as a neural network.

Using such measures of a strength of association, one or more camera settings may be evaluated in response to a given one or more image characteristics.

Hence for a given image, one or more image characteristics extracted from it may be used to find the heterogeneous set of camera settings having the best overall correlation with the image, where several different sets of camera settings may have some respective correlation with one or more characteristics of the image, such as one or more parametric descriptions of the image, or the GPS position of the image, but one set of camera settings will have the strongest overall correlation (e.g. largest sum of correlations) with the one or more extracted image characteristics, and so this will present the best stored approximation to the camera settings actually used when extracting the image characteristics.

Similarly, for a given image, one or more image characteristics extracted from it may be used to find individual camera setting values from one or more homogenous sets of camera settings having the best overall correlation with the image, where the individual setting value in a homogenous set having the strongest overall (or sum) correlation with the one or more image characteristics extracted from the image is selected, for one or more homogenous sets of camera settings for which manual settings are desired to be selected. Hence for example a particular ISO value may have been used very frequently in a given location, whilst there is no strong correlation between different aperture values for location, but there is a strong correlation with a particular aperture value for the particular type of image indicated by some or all of the thumbnail or feature vector of the image.

In this way one: many, many: one and many: many associations between individual and sets of camera settings and individual and sets of image characteristics can be obtained, as desired.

The correlation processor 40 may hold such correlations, enabling identification of stored camera settings (optionally either as sets and/or individual values as explained previously herein, depending on the embodiment of the disclosure), in response to image characteristics (again either as sets and/or individual values as explained previously herein, depending on designer choice). Hence if image characteristics of one of the images previously captured by the user and used to generate the correlations was input to the correlation processor, then the stored camera settings most strongly correlating with those image characteristics would be identified by the correlation processor.

Referring again to FIG. 1, the camera comprises a detection processor 50 configured to detect live image characteristics for a current live view obtained by the camera. It will be appreciated that in use, a camera may have a 'live view'. For some compact cameras, this will comprise an actual image, typically displayed on a display 60 of the camera. The display may be for example a fixed or tiltable screen, an electronic viewfinder, a wired or wirelessly linked display, for example a display of a mobile phone or other remote screen. The display may be a touch screen.

Meanwhile for some SLR cameras this will not comprise an actual image, but may comprise a variety of live data providing some parametric descriptions of the scene being viewed by an image sensor 52, and/or settings values of the camera selected in response to such parameters, as obtained from an image processor 54. In both cases, it may also comprise GPS data obtained from a separate GPS sensor 56. It will be appreciated that GPS is not the only source of positioning or location information envisaged and sensor 56 may derive its location from other signals or by other means.

It will be appreciated that positioning and location information such as co-ordinates may be searched in a database to identify the likely subject and/or location characteristic of an image to be taken. A waterfall, a sports event, a beach, an agricultural facility where growth of plants or livestock is monitored are examples thereof. Captured images may be assigned metadata corresponding to such location characteristics based on location information. Use of an area- or subject-based tag advantageously reduces variability when making associations or generating correlations. For example, if a user regularly visits a sports field, but randomly stands on different sides, whilst GPS co-ordinates may suggest a significant difference, both sets of co-ordinates may map to the same venue. It will also be appreciated that the size of a given venue is typically captured by this process of reverse-geolocation, so that differences in distance at a large sports venue will still map to that venue, whilst a similar difference in distance centred on a home address may indicate whether the user is inside or outside.

It will be appreciated that such subject or location characteristics can thus be treated as image characteristics in a manner similar to those described elsewhere herein, as they characterise a property of the image. In particular, camera settings can be associated with such image characteristics (either alone or in conjunction with other image characteristics as described herein), either specific to the particular subject/location, or on the basis of correlation with heterogeneous or homogenous sets of camera settings, again as described elsewhere herein.

Hence when correlating a live view to identify appropriate camera settings, the location co-ordinates corresponding to the live view may be used to identify likely location characteristics, for example by sending location information such as co-ordinates over a network to a server storing location information and corresponding location characteristics. The image characteristics of the live view, comprising subject or location characteristics, may then be correlated with camera settings, based on the correlations obtained for previous images having metadata corresponding to similar subject/location characteristics (and optionally other image characteristics).

Optionally, a distance threshold to a specific subject/location, or to a prior set of coordinates, may be applied for current location coordinates. In this case, if there is a threshold match (i.e. current co-ordinates are within a threshold distance of a specific subject/location, or a prior set of coordinates) for a live view image, then appropriate camera settings for the live view may be identified.

Figure 5:
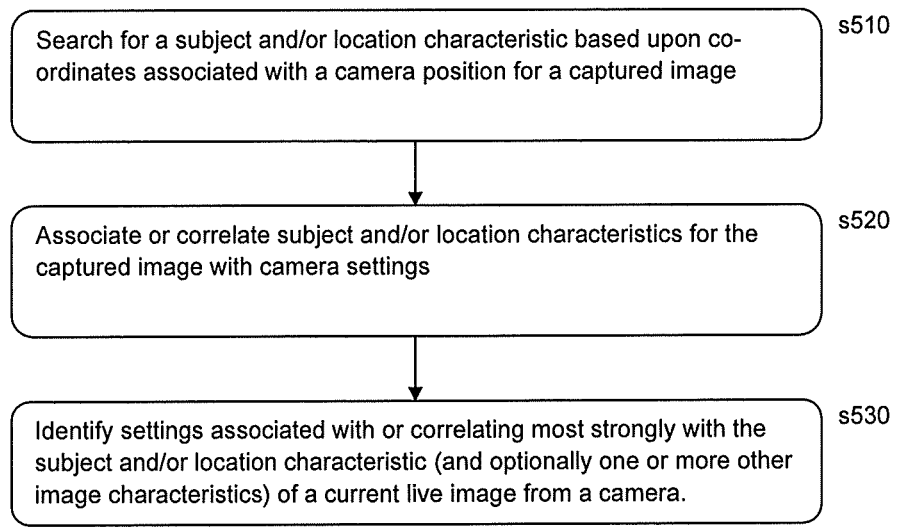
FIG. 5 is a flow diagram of a method of identifying camera settings for a camera in accordance with embodiments of the present disclosure.

Hence referring to FIG. 5, a technique for implementing subject and/or location based selection of camera settings may comprise the optional steps of searching (s510) for a subject and/or location characteristic as described above, based upon co-ordinates associated with a camera position and any optional distance threshold for a captured image; associating or correlating (s520) subject and/or location characteristics found for the captured image, along with any other chosen image characteristics, with camera settings (for example settings from within existing or generated homogenous or heterogeneous sets, as described herein, or a set of settings specifically associated with a subject and/or location); and subsequently identifying (s530) settings associated with or correlating most strongly with the subject and/or location characteristic (and optionally one or more other image characteristics) of a current live image from a camera. It will be appreciated however that the above steps work equally well simply for location coordinates such as GPS co-ordinates, optionally with a distance threshold/tolerance, either when a subject and/or location characteristic cannot be found in a database (for example when a bird watcher visits a remote location with few landmarks), or where such reverse geolocation is simply not used or not available (for example when a network link is not available). As will be discussed elsewhere herein, the association or correlation step s520 may occur on the camera or on a remote device such as a PC.

In this way, camera settings most strongly associated with a particular subject and/or location, or similarly with a set of location co-ordinates, can be selected.

The detection processor 50 may then output one or more live image characteristics to the correlation processor.

The correlation processor is then configured to identify stored respective camera settings most closely correlating to the live image characteristics. Depending on the embodiment, either individual image characteristics, or a predetermined set of image characteristics are input to the correlation processor, and in response according to designer choice either individual camera setting values or a predetermined set of camera setting values, having the strongest correlations to the input, are identified.

In this way, previously learned correlations between a group of the user's prior photographs and the settings used to take them can be utilised to select current settings in response to the current live image.

By using a group of the user's prior photographs that were taken using manual settings according to the user's preferences at the time of taking those photographs, the camera is therefore able to approximate or emulate the user's manual setting preferences in response to current image conditions. Embodiments of the disclosure apply actual camera settings used successfully to subjectively good effect to capture an image under similar current image conditions. Embodiments may then produce an improved or preferred result for the user over a camera's automatic or semi-automatic mode whilst not requiring significant set up time, parameter analysis or experimentation by the user.

Accordingly, the camera is then arranged to provide identified camera settings to the user of the camera. In one embodiment, the camera automatically adopts the identify camera settings. It will be appreciated that where some of the settings are manual and some automatic (or equally where the identified camera settings represent only a subset of all settings used by the camera to take a photograph), then any identified settings that are not to be treated as manual settings may subsequently adjust in response to live image conditions, in the camera's normal manner.

Typically automatic settings are updated at a relatively high frequency (for example multiple times per second). Optionally, the camera may also periodically use the correlation processor to identify settings, for example at a lower frequency (for example every 1, 2, 3, 4, 5 or 10 seconds or any suitable interval). Similarly optionally, the camera may suspend any periodic use of the correlation processor in response to certain actions of the user, such as partially pressing a shutter button or setting a self-timer. In this case, the camera may or may not alter automatic settings depending on other considerations, but will not alter the retrieved manual settings.

Optionally, the camera is adapted to obtain two images in response to the user taking a shot, one with automatic camera settings (using the camera's conventional automatic mode and algorithm or one such mode if there are multiple of them), and the other based upon the identified camera settings. The images may be obtained either by the camera or sensor capturing shots in quick succession using the different settings, and/or by capturing a single shot in a RAW format for example, (or a relatively higher resolution shot in another format) and then processing it according to different settings, as appropriate. In embodiments, the camera may present the effect of different settings on the display sequentially, each for a predetermined period such as two seconds, or by detecting a swipe action of a touch sensitive screen, for example based on the live view at an instance in time or indeed changing live view. In embodiments, the camera may present the effect of different settings on the display on multiple (smaller) versions of the live view at the same time.

In embodiments, camera may present the effect of different settings on the display on one versions of the live view at the same, applying the different effects to different portions of the image, for example two different effects, one applied to each side of a face of the subject of the live view; the potions may be regular such as a rectangle or irregular such as a head, face or a person.

In another embodiment, the camera is arranged to present the retrieved camera settings to the user, who may then select use of the identified camera settings through a user interface, thereby allowing the user to choose whether the camera should adopt them. This may be done to any suitable means, such as for example highlighting one of a predetermined number of sets of camera settings on the display. Alternatively or in addition, the user may be allowed to name sets of settings to help them recall their effect or provenance, and so this name may be highlighted or presented to the user. Alternatively or in addition, the values of selected settings may be presented to the user, optionally in an order of priority that is either predetermined or is based upon a degree of difference between the selected settings and the camera's current settings, thereby quickly indicating to the user the extent of change that adopting the settings is likely to make to the image taken.

Optionally, the correlation processor is configured to identify and retrieve a predetermined number of stored respective camera settings most closely correlating to the live image characteristics (for example, for the top three correlation scores). The camera is then arranged to present two or more of the predetermined number of identified camera settings to the user, who may then select use of one of the identified camera settings through a user interface.

Again, depending on how the correlation processor is chosen to operate in a given embodiment, the predetermined number of stored respective camera settings may correspond to alternative individual values within one or more respective homogenous sets, and/or alternative heterogeneous sets.

It will be appreciated that many photographers use multiple cameras either in parallel or over time, and so it would be desirable to be able to use photos and settings from one or more other cameras. Similarly, photographers may take many photos, and only be in a position to decide which photos are best long after the image is taken. Furthermore, the photographer may not wish to make that judgement based upon the relatively small image available on a camera display, but instead based upon a review on a larger screen of a separate computer.

Consequently, optionally the correlation processor is configured to provide a correlation between stored sets of image characteristics derived from previous images and stored sets of camera settings, the image characteristics and camera settings having been obtained from a remote source, such as another camera, computer, data store, mobile phone or the like acting as a remote device.

Hence optionally the camera may comprise an interface configured to receive sets of image characteristic data and camera settings from a remote device, and correlation and/or associative data relating these in accordance with any of the techniques described herein. Again the sets may be homogenous and/or heterogeneous as described previously herein. The interface may be wired or wireless.

So far, it has been assumed that the correlation values, either in terms of simple associations, or correlation strengths, are available to the correlation processor. Optionally, the correlation processor may generate these correlations within the camera. For example, whenever a user makes a manual setting to the camera, either that individual setting value, or those current settings of the camera comprising a heterogeneous set, may be temporarily stored, and then characteristics of images taken using the settings may be associated with them, either as a simple association or as a function of frequency etc. Such temporary data may be stored for a predetermined period of time before being deleted, unless the same manual setting is selected within this period of time. If this occurs, then the temporary data and associations/correlation may be moved to the first and second memories described herein on the basis that user may frequently select these manual settings. Notably even data in the first and second memories may be deleted if consistently not selected or if associations or correlations are comparatively weak. For example, if there are a finite amount of storage, and temporary data could be moved into the first and second memories, then optionally the least frequently used settings and image characteristics data, or the settings and image characteristics data that has been unused for the longest time, may be deleted to make space.

In this way, the camera can over time build up its own correlations.

However, there may be potential problems with this approach. Firstly, where correlations are based on frequency, it is possible that a photographer may set manual settings for a first particular event and then only take one or two photographs that are considered to be high value to the photographer. The photographer may then subsequently set manual settings for a second particular event which appears to necessitate taking a large number of photographs (for example, trying to capture a person looking in the right direction, which has nothing to do with the properties of the image, but instead properties of the subject). Potentially this can result in an imbalance in the appropriate correlations between certain image characteristics and settings values. Optionally, a user could select representative images from the subjectively most successful photographs taken, as described previously herein, but may not have an opportunity to do so at the time, and it may be cumbersome to do so using the interface available on the camera.

Hence alternatively or in addition to generating correlations within the camera, a PC, tablet, phone or other suitable computer such as a videogame console having photo display software, may be used to generate correlations between image characteristics and camera settings, typically for a predetermined number of sets of data corresponding to memory set aside within the camera for this purpose.

Figure 2:
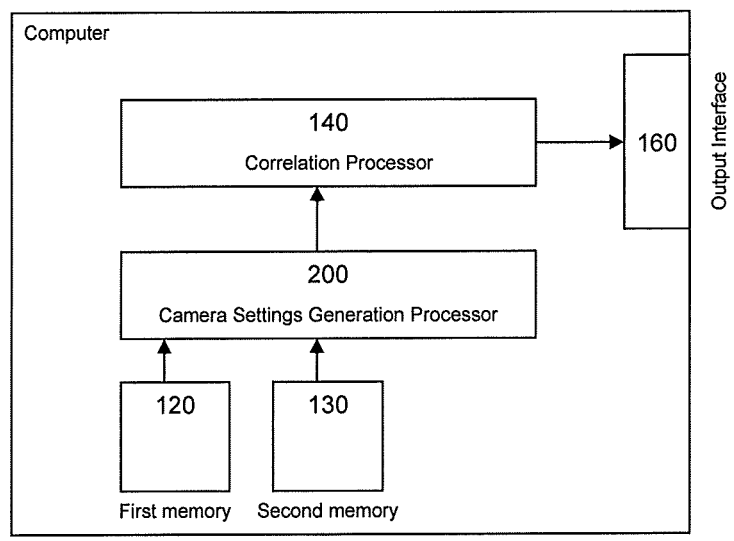
FIG. 2 is a schematic diagram of a computer in accordance with embodiments of the present disclosure.

Hence referring to FIG. 2, in an embodiment of the present disclosure, a computer 110 comprises a first memory 120 configured to store a plurality of respective camera settings previously used by a user of a camera when capturing previous images, and a second memory 130 configured to store a plurality of image characteristics derived for previous images captured by the user. As described previously herein, these may be organised in homogenous or heterogeneous sets, and the memory may be a shared memory resource such as RAM, flash memory or an HDD or SSD.

The computer may then output images for presentation to the user, for example in the form of thumbnails. The computer may have images and settings data from multiple cameras. For the purposes of explanation, it can be assumed that the images being presented to the user were taken whilst using least one manual setting on the respective camera. This may be achieved either using an automated filter responsive to data associated with an image indicating that it was taken using a manual setting, or by the user selecting particular images.

The user can then select representative images that they think are particularly good, for example by clicking on or applying markers to respective images, to build up a portfolio of images that they like.

The computer then comprises a camera settings generation processor 200 (e.g. a general-purpose CPU operating under suitable software instruction) that is then operable to generate a predetermined number of respective camera settings that together approximate, to within predetermined tolerances, the largest number of camera settings corresponding to the selected images.

Again the predetermined number may relate to homogenous sets of values for single settings, or to heterogenous sets of camera settings.

For example, a target camera may be able to hold eight manual settings profiles, corresponding to eight heterogenous sets of camera settings. It will be appreciated that eight is a non-limiting example, and any suitable number may be considered.

The computer thus generates eight heterogenous sets of camera settings that between them are, to within predetermined tolerances, similar to the camera settings associated with the largest number of the images selected by the user (or simply the largest number of images stored in a relevant storage area) and hence also the largest number of corresponding camera settings.

The generation process may simply select existing sets of camera settings found with the images under consideration, and find the predetermined number that are similar to the largest number of other sets of camera settings, as described above. Alternatively, individual setting values within a set may be selected to maximise the number of similar sets of camera settings.

If homogenous sets of settings values are used in the target camera, then these may be selected in response to one or more corresponding image characteristics as described previously herein. In this case, a predetermined number of different values may be selected for each homogenous set to cover the corresponding setting values of the most images under consideration.

It will be appreciated that digital images typically comprise so-called EXIF information, which may specify some of the camera settings used when the photo was captured. This camera setting information, together with any other settings information specifically collected by a camera implementing techniques described herein, may thus be used when generating heterogeneous or homogenous sets of camera setting data.

The computer also comprises a correlation processor 140 (e.g. a general-purpose CPU operating under suitable software instruction) configured to provide a correlation between stored image characteristics and stored respective camera settings, and an output interface 160.

The correlation processor is configured to identify respective image characteristics most closely correlating to the predetermined number of respective camera settings.

As described previously, this could be achieved using simple associations. For example, for each generated heterogenous set of camera settings, select one or more images having camera settings most similar to that respective set, and associate the image characteristics (or equally averages thereof) for the or each of those images with that respective set of camera settings.

Meanwhile a similar principle may be employed for settings values for homogenous sets to associate different values with one or more image characteristics.

Again in either case, alternatively or in addition to simple association, selection according to the strongest correlation (e.g. highest frequency of co-occurrence) may be used, as may any other associative approach, such as the use of neural networks or other machine learning algorithms.

It will be appreciated that if a camera is capable of generating so-called EXIF information for an image, then it should be capable of generating similar information for a live view. Hence in principle a camera's anticipated camera settings for a shot of live view could be associated or correlated with the stored camera settings. However, it will also be appreciated that if the present techniques result in a camera that selects alternative camera settings to those normally automatically generated by the camera, then extracting automatic camera settings from a live image may not reliably provide useful basis for association with stored camera settings, at least in the absence of other image characteristics that serve to contextualise the current automatic settings—such as GPS data, a reduced resolution thumbnail, other parametric descriptions of the image or a feature vector descriptive of salient aspects of the image, as discussed previously. In other words, embodiments of the present disclosure assume that the automatic settings are wrong (at least in the sense that they do not produce the aesthetic results the user prefers), and the training data for creating shots that the user does prefer (i.e. the data used by the camera settings generation processor and the correlation processor of the PC) only contains settings that the user considers to be right. Hence it is preferable to associate sets of camera settings with sets of image characteristics as described herein, although the skilled person will appreciate that any data, potentially including one or more aspects of camera setting data automatically predicted in response to a live view, may be used if there is a strong correlation between this and the stored sets of camera settings.

Finally, the output interface 160 is configured to output the predetermined number of respective camera settings and identified image characteristics to a camera. This may be done via a wired or wireless interface, or via an intermediary such as a server or mobile phone. When a first camera is taught camera settings derived from one or more second cameras it may be desirable to apply one or more offsets to the camera settings. For example settings from one manufacturer of type or camera sensor may not give the desired result when applied to a first camera. It may be for example desirable to "tune" the camera setting to apply one exposure stop in case the taught camera settings typically underexpose images when transferred from one camera to another with different image processing algorithms, sensor or lens characteristics. Consequently the first camera or an intermediate device such as the computer described above may comprise conversion data to convert image characteristics and camera settings, as necessary, to be consistent with those of the first camera. Alternatively or in addition, image characteristics and camera settings may be similarly converted to a standardised representation, and a subsequently conversion can be applied specific to individual models of camera.

Embodiments of the disclosure provide a user selectable camera mode which derives for a intended image capture, as an alternative to an automatic mode, camera circuitry settings which are based on previously set manual settings which have resulted in a subjectively good image capture, by comparing the intended image with images for which the previously set manual settings have been applied (typically indirectly, by using the established association or correlation between image characteristics of previous images with the stored sets of camera settings to identify a set of camera settings best corresponding to current image characteristics), in order to derive the camera circuitry settings to be applied. For example, a beach portrait scene with the sun high in the sky may increase (in comparison to an automatic mode) the exposure setting to mitigate shadows cast on a face. For example, positioning data may be used to identify that the shot is in proximity to a waterfall and that shots taken in proximity to waterfalls benefit from a fast shutter setting to capture water splashing.

The user interface described herein may in embodiments be graphical user interface, it may comprise a microphone input and sound processor to enable control by voice or a combination thereof.

Variations in the above techniques may be considered, such as for example optionally populating some or all of the associated sets of camera settings and image characteristics with data obtained from a different camera to the camera currently using this data, and optionally this data being obtained from a different user, such as for example a professional photographer who provides this data to bootstrap (assist by pre-populating) this function of the camera. Optionally this data can be replaced over time by the user's own data. Similarly, a manufacturer of the camera may preload such data within the camera to enable this function of the camera. Similarly, optionally a user may visit a website that provides galleries of photographs created using different manual settings, and select one or more to form an associated pair of camera settings and image characteristics within the camera, for example via the PC described herein.

It will be appreciated that a camera and a remote device such as a PC operating in conjunction with each other (for example the camera providing the PC with images and camera settings data, and the PC providing the camera with sets of camera settings data and corresponding image characteristic data for selection when similar image characteristic is encountered) operate as a system for selecting camera settings, comprising at least these two components.

It will be appreciated that in respect of the apparatus and techniques described herein, the images may be still or video images, and the camera may be a still and/or video camera.

It will also be appreciated that the camera and computer respectively implement methods of selecting camera settings for a camera.

Figure 3:
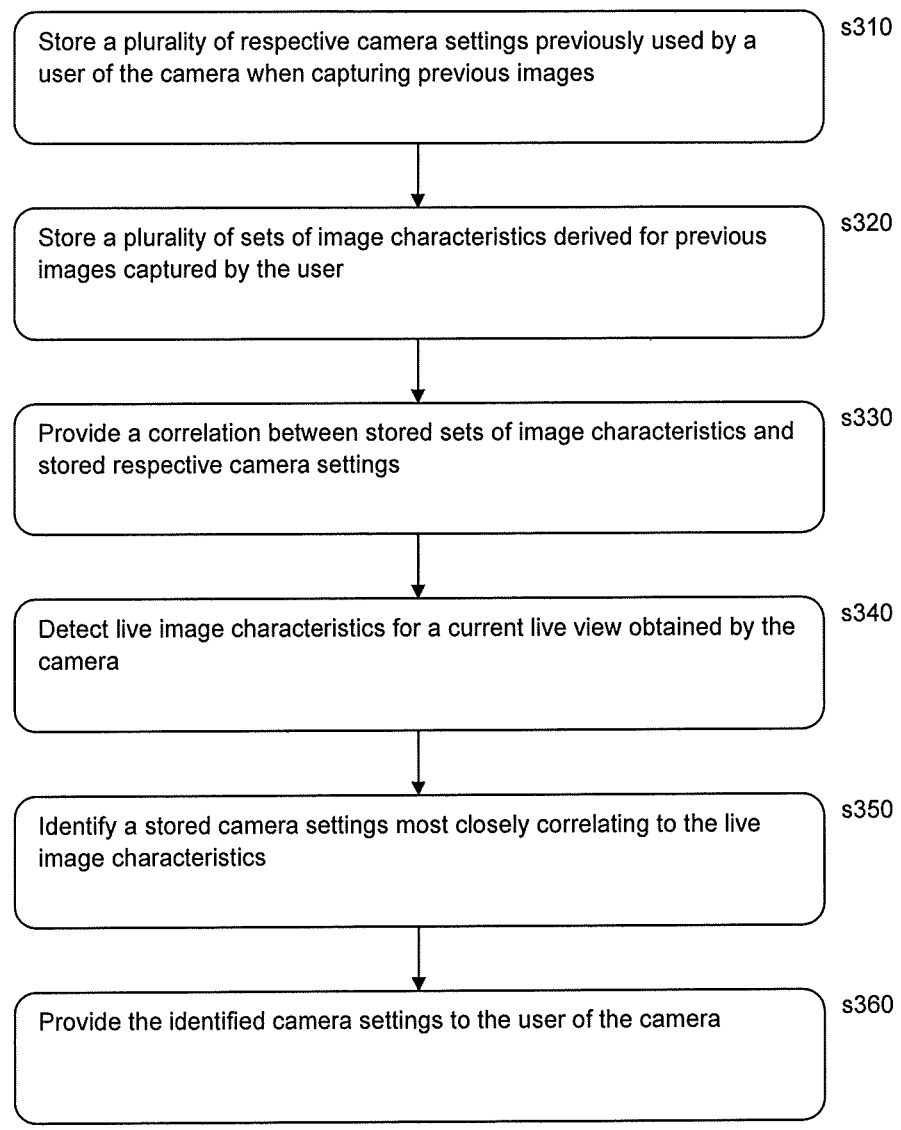
FIG. 3 is a flow diagram of a method of selecting camera settings for a camera in accordance with embodiments of the present disclosure.

Hence referring now to FIG. 3, a method of selecting camera settings for a camera, by a camera, comprises:

In a first step 310, storing a plurality of respective camera settings previously used by a user of the camera when capturing previous images, for example in a shared RAM or flash memory of the camera as described previously herein.

In a second step 320, storing a plurality of sets of image characteristics derived for previous images captured by the user, similarly for example shared RAM or flash memory of the camera as described previously herein.

In a third step 330, providing a correlation between stored sets of image characteristics and stored respective camera settings, using any one or more of the techniques described previously herein.

In a fourth step 340, detecting live image characteristics for a current live view obtained by the camera; these may include properties extracted directly from the image such as a thumbnail of feature vectors, meta data associated with capture of the image, and coincident data collected by the camera at the same time, such as GPS information, as described previously herein.

In a fifth step 350, identifying a stored camera settings most closely correlating to the live image characteristics, using any of the techniques described previously herein; and In a sixth step 360, providing the identified camera settings to the user of the camera, for example by adopting the identify camera settings, or presenting them to the user and using a UI of the camera to receive a user indication of whether or not to adopt them.

Figure 4:
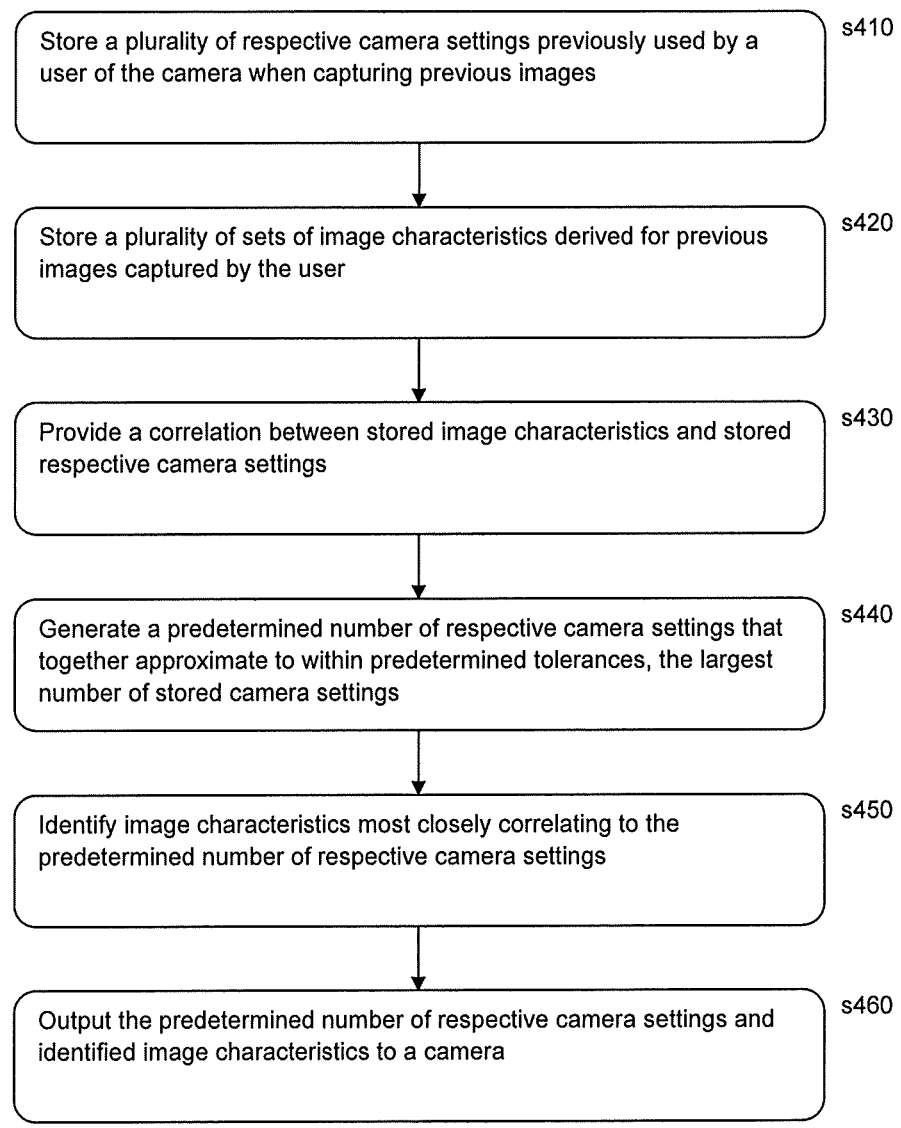
FIG. 4 is a flow diagram of a method of selecting camera settings for a camera in accordance with embodiments of the present disclosure.

Meanwhile, referring now to FIG. 4, a method of selecting camera settings for use by a camera, by a remote device such as a PC, comprises:

In a first step 410, storing a plurality of respective camera settings previously used by a user of a camera when capturing previous images;

In a second step 420, storing a plurality of image characteristics derived for previous images captured by the user;

In a third step 430, providing a correlation between stored image characteristics and stored respective camera settings In a fourth step 440, generating a predetermined number of respective camera settings that together approximate to within predetermined tolerances, the largest number of stored camera settings;

In a fifth step 450, identifying image characteristics most closely correlating to the predetermined number of respective camera settings; and In a sixth step 460, outputting the predetermined number of respective camera settings and identified image characteristics to a camera.

It will be appreciated that the above methods may be carried out on conventional hardware, such as a still or video camera, and a PC, as appropriate, suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present disclosure may comprise features as described by the following clauses:

Clause 1. A camera, comprising
a memory configured to store a plurality of respective camera settings previously used by
a camera when capturing images;
a memory configured to store a plurality of image characteristics derived for captured images;
a correlation processor configured to provide a correlation between stored image characteristics and stored respective camera settings;
a detection processor configured to detect live image characteristics for a current live view obtained by the camera;
the correlation processor being configured to identify stored respective camera settings most closely correlating to the live image characteristics; and
the camera being configured to provide the identified camera settings.

Clause 2. The camera of clause 1, in which the respective camera settings are a set of camera settings associated with the capture of a previous image.

Clause 3. The camera of clause 1 or 2, in which camera is arranged to adopt the identified camera settings.

Clause 4. The camera of any one of the preceding clauses, in which
the camera is adapted to obtain two images in response to the taking of a shot, one with automatic camera settings, and the other based upon the identified camera settings.

Clause 5. The camera of clause 1, in which the camera is arranged to present the retrieved camera settings via a user interface for selection.

Clause 6. The camera of clause 5, in which
the correlation processor is configured to identify and retrieve a predetermined number of stored respective camera settings most closely correlating to the live image characteristics
the camera is arranged to present two or more of the predetermined number of identified camera settings via a user interface for selection.

Clause 7. The camera of any preceding clause, in which
the correlation processor is configured to provide a correlation between stored sets of image characteristics derived from previous images and stored sets of camera settings, the image characteristics and camera settings having been obtained from a remote source.

Clause 8. The camera of clause 7, comprising
an interface configured to receive sets of image characteristic data and camera settings from a remote device.

Clause 9. The camera of any preceding clause, in which the image characteristic data comprises one or more selected from the list consisting of:
i. position data indicative of the location of capture of an image;
ii. subject or location characteristic data;
iii. feature data derived from an image;
iv. a thumbnail of an image; and
v. a parametric description of an image.

Clause 10. The camera of any preceding clause, in which the images are video images, and the camera is a video camera.

Clause 11. A method of selecting camera settings for a camera, comprising the steps of:
storing a plurality of respective camera settings previously used by the camera when capturing images;
storing a plurality of sets of image characteristics derived for captured images;
providing a correlation between stored sets of image characteristics and stored respective camera settings;
detecting live image characteristics for a current live view obtained by the camera; identifying a stored camera settings most closely correlating to the live image characteristics; and
providing the identified camera settings to the user of the camera.

Clause 12. A computer, comprising
a memory configured to store a plurality of respective camera settings previously used by a camera when capturing images;
a memory configured to store a plurality of image characteristics derived for captured images;
a correlation processor configured to provide a correlation between stored image characteristics and stored respective camera settings;
an output interface; and
a camera settings generation processor, configured to generate a predetermined number of respective camera settings that together approximate to within predetermined tolerances, the largest number of stored camera settings; and in which
the correlation processor is configured to identify image characteristics most closely correlating to the predetermined number of respective camera settings; and
the output interface is configured to output the predetermined number of respective camera settings and identified image characteristics to a camera.

Clause 13. A system for selecting camera settings for a camera, comprising:
the camera of any one of claims 1 to 10; and
the computer of claim 12.

Clause 14. A method of selecting camera settings for a camera, comprising the steps of:
storing a plurality of respective camera settings previously used by a camera when capturing images;
storing a plurality of image characteristics derived for captured images;
providing a correlation between stored image characteristics and stored respective camera settings;
generating a predetermined number of respective camera settings that together approximate to within predetermined tolerances, the largest number of stored camera settings;
identifying image characteristics most closely correlating to the predetermined number of respective camera settings; and
outputting the predetermined number of respective camera settings and identified image characteristics to a camera.

Clause 15. A non-transitory computer readable medium including computer program instructions, which when executed by a computer causes the computer to perform the method of clause 11 or clause 14.

The invention claimed is:

1. A camera, comprising
a first memory configured to store a plurality of respective camera settings previously used by the camera when capturing images;

a second memory configured to store a plurality of image characteristics derived for the captured images;

a correlation processor configured to provide a correlation between the stored plurality of image characteristics and the stored plurality of respective camera settings;

a detection processor configured to detect live image characteristics for a current live view obtained by the camera;

the correlation processor being configured to identify stored respective camera settings most closely correlating to the live image characteristics based on the correlation between the stored plurality of image characteristics and the stored plurality of respective camera settings; and the camera being configured to provide the identified camera settings.

2. The camera of claim 1, wherein the stored plurality of respective camera settings are a set of camera settings associated with the capture of a previous image.

3. The camera of claim 1, wherein the camera is arranged to adopt the identified camera settings.

4. The camera of claim 1, wherein
the camera is configured to obtain two images in response to a taking of a shot, one with automatic camera settings, and the other based upon the identified camera settings.

5. The camera of claim 1, wherein the camera is arranged to present retrieved camera settings via a user interface for selection.

6. The camera of claim 5, wherein
the correlation processor is configured to identify and retrieve a predetermined number of stored respective camera settings most closely correlating to the live image characteristics, and the camera is arranged to present two or more of the predetermined number of identified camera settings via a user interface for selection.

7. The camera of claim 1, wherein
the correlation processor is configured to provide a correlation between stored sets of image characteristics derived from previous images and stored sets of camera settings, the image characteristics and camera settings having been obtained from a remote source.

8. The camera of claim 7, further comprising
an interface configured to receive sets of image characteristic data and camera settings from a remote device.

9. The camera of claim 1, wherein data of the stored plurality of image characteristics comprises one or more selected from the list consisting of:
   i. feature data derived from an image;
   ii. a thumbnail of an image; and
   iii. a parametric description of an image.

10. The camera of claim 1, wherein data of the stored plurality of image characteristics comprises position data indicative of a location of capture of an image.

11. The camera of claim 1, wherein data of the stored plurality of image characteristics comprises subject or location characteristic data.

12. The camera of claim 1, wherein the captured images are video images, and the camera is a video camera.

13. A method of selecting camera settings for a camera, comprising:
    storing a plurality of respective camera settings previously used by the camera when capturing images;
    storing a plurality of sets of image characteristics derived for the captured images;
    providing a correlation between the stored plurality of sets of image characteristics and the stored plurality of respective camera settings;
    detecting live image characteristics for a current live view obtained by the camera;
    identifying stored respective camera settings most closely correlating to the live image characteristics based on the correlation between the stored plurality of sets of image characteristics and the stored plurality of respective camera settings; and
    providing the identified camera settings to the user of the camera.

14. A computer, comprising:
    a first memory configured to store a plurality of respective camera settings previously used by the camera when capturing images;
    a second memory configured to store a plurality of image characteristics derived for the captured images;
    a correlation processor configured to provide a correlation between the stored plurality of image characteristics and the stored plurality of respective camera settings;
    an output interface; and
    a camera settings generation processor, configured to generate a predetermined number of respective camera settings that together approximate to within predetermined tolerances, a largest number of stored camera settings, wherein
    the correlation processor is configured to identify image characteristics most closely correlating to the predetermined number of respective camera settings based on the correlation between the stored plurality of image characteristics and the stored plurality of respective camera settings, and
    the output interface is configured to output the predetermined number of respective camera settings and identified image characteristics to the camera.

15. A system for selecting camera settings for a camera, comprising:
    a camera, including:
        a first memory configured to store a plurality of respective camera settings previously used by the camera when capturing images,
        a second memory configured to store a plurality of image characteristics derived for the captured images,
        a correlation processor configured to provide a correlation between the stored plurality of image characteristics and the stored plurality of respective camera settings,
        a detection processor configured to detect live image characteristics for a current live view obtained by the camera,
        the correlation processor being configured to identify stored respective camera settings most closely correlating to the live image characteristics based on the correlation between the stored plurality of image characteristics and the stored plurality of respective camera settings, and
        the camera being configured to provide the identified camera settings.

16. A method of selecting camera settings for a camera, comprising:
    storing a plurality of respective camera settings previously used by the camera when capturing images;
    storing a plurality of image characteristics derived for the captured images;

providing a correlation between the stored plurality of image characteristics and the stored plurality of respective camera settings;

generating a predetermined number of respective camera settings that together approximate to within predetermined tolerances, a largest number of stored camera settings;

identifying image characteristics most closely correlating to the predetermined number of respective camera settings based on the correlation between the stored plurality of image characteristics and the stored plurality of respective camera settings; and outputting the predetermined number of respective camera settings and identified image characteristics to the camera.

17. A non-transitory computer readable medium including computer program instructions, which when executed by a computer causes the computer to perform the method of claim 13.

18. A non-transitory computer readable medium including computer program instructions, which when executed by a computer causes the computer to perform the method of claim 16.

* * * * *